US008891809B2

(12) United States Patent
Danovi

(10) Patent No.: US 8,891,809 B2
(45) Date of Patent: Nov. 18, 2014

(54) SPLIT MAGNET LOUDSPEAKER

(75) Inventor: Benny Danovi, Ann Arbor, MI (US)

(73) Assignee: Harman International Industries, Inc., Northridge, CA (US)

( * ) Notice: Subject to any disclaimer, the term of this patent is extended or adjusted under 35 U.S.C. 154(b) by 519 days.

(21) Appl. No.: 12/868,116

(22) Filed: Aug. 25, 2010

(65) Prior Publication Data

US 2012/0051581 A1 Mar. 1, 2012

(51) Int. Cl.
*H04R 1/00* (2006.01)
*B23P 11/00* (2006.01)
*H04R 9/02* (2006.01)

(52) U.S. Cl.
CPC .......... *H04R 9/025* (2013.01); *H04R 2209/022* (2013.01)
USPC .......... 381/412; 29/428

(58) Field of Classification Search
USPC .......... 381/412, 421; 310/12.24
See application file for complete search history.

(56) References Cited

U.S. PATENT DOCUMENTS 6,088,466 A * 7/2000 Proni .......... 381/397
6,940,992 B2 * 9/2005 Stiles .......... 381/412
2004/0086145 A1 5/2004 Stiles
2006/0093180 A1 5/2006 Kim .......... 381/412
2006/0251286 A1 * 11/2006 Stiles .......... 381/421
2007/0223777 A1 * 9/2007 Mihelich et al. .......... 381/412
2007/0230737 A1 * 10/2007 Hyde .......... 381/421
2008/0205690 A1 * 8/2008 Danovi et al. .......... 381/412
2010/0201209 A1 * 8/2010 Keating .......... 310/12.14

FOREIGN PATENT DOCUMENTS

EP 0591837 B1 5/1997 .......... H04R 9/02
EP 1418793 A2 12/2004
JP 6261393 A 9/1994
JP 11155194 A 6/1999
JP 2000138996 A 5/2000

(Continued)

OTHER PUBLICATIONS

Korean Office Action issued on Jul. 24, 2012, in Korean Patent Application No. 10-20110083890, with English translation (6 pgs.).

(Continued)

*Primary Examiner* — Duc Nguyen
*Assistant Examiner* — Phan Le
(74) *Attorney, Agent, or Firm* — Brooks Kushman P.C.

(57) ABSTRACT

A loudspeaker can provide magnetic flux from polarity-aligned split magnets to drive voice coils and generate sound. The loudspeaker may have reduced stray magnetic fields and a BL curve with symmetric and linear characteristics. The loudspeaker can include a core, split magnets, a magnet housing, a core cap, and a voice coil gap formed between the magnet housing and the core cap. Magnetic flux produced by the split magnets may be combined, directed, and/or concentrated by the core cap and magnet housing within the voice coil gap. At least portions of a voice coil may be positioned within the voice coil gap and a diaphragm may be coupled to the voice coil. A bucking magnet assembly may contain a magnetic flux of the magnet structure to further improve performance. The bucking magnet assembly may include split magnets with an aligned polarity that is opposite the polarity of the magnet structure.

36 Claims, 11 Drawing Sheets

(56) References Cited

FOREIGN PATENT DOCUMENTS

| | | | | |
|---|---|---|---|---|
| JP | 2000188798 A | 7/2000 | | |
| JP | 2002078083 A | 3/2002 | | |
| JP | 2008278235 A | 11/2008 | | |
| KR | 1020000040796 A | 7/2000 | ............... | H04R 9/02 |
| KR | 1020040082462 A | 9/2004 | ............... | H04R 9/02 |
| WO | WO0052962 A1 | 8/2000 | | |
| WO | 2006/043764 | 4/2006 | | |

OTHER PUBLICATIONS

Japanese Office Action issued on Feb. 20, 2013, in Japanese Patent Application No. 2011-107697, with English translation (10 pgs.).

Extended European Search Report dated Aug. 19, 2013, pp. 1-6, European Patent Application No. 11165216.0-1910, European Patent Office, Munich, Germany.

Japanese Office Action for 2013-105952 dated Jan. 24, 2014.

* cited by examiner

SPLIT MAGNET LOUDSPEAKER

BACKGROUND OF THE INVENTION

1. Technical Field

The invention relates to loudspeakers, and in particular, to loudspeakers with split multiple magnets having polarities aligned in the same direction.

2. Related Art

Loudspeakers convert electrical energy into sound and typically include a diaphragm, a magnet structure, and a voice coil. The magnet structure may include one or more magnets and a core cap. The core cap can direct and concentrate a magnetic flux produced by the magnets into a voice coil gap. The voice coil can be connected to the diaphragm and positioned in the voice coil gap. When electrical energy flows into the voice coil, an induced magnetic field can be created that interacts with the magnetic flux in the voice coil gap. The voice coil may carry a current in a direction substantially perpendicular to the direction of the magnetic flux produced by the magnet structure, so that the interaction between the voice coil current and the magnetic flux can cause linear oscillation of the voice coil within the length of the voice coil gap, which moves the diaphragm in order to produce audible sound.

Some loudspeakers utilize a magnet structure including a single relatively thick magnet supported by a magnetically conductive pedestal. This arrangement can allow for clearance suitable for mechanical travel of the voice coil within the voice coil gap to attain the desired amount of magnetic flux to drive the voice coil in the voice coil gap, such as in a subwoofer. However, using a single thick magnet supported by a magnetically conductive pedestal may result in significant fringe magnetic fields that can increase the risk of reducing the efficiency of the loudspeaker. In addition, the voice coil motor force constant (BL) (magnetic flux density (B) multiplied by the effective length (L) of the voice coil wire within the entire length of the air gap) may have asymmetric characteristics. For example, a BL that is non-linear and variable can cause an increased risk of distortion and unsatisfactory performance. Moreover, using a single thick magnet supported by a magnetically conductive pedestal may result in a larger mass loudspeaker which can increase the manufacturing and shipping costs of the loudspeaker. Therefore, a need exists for a loudspeaker magnet structure that can provide reduced fringe magnetic fields. A need also exists for a loudspeaker magnet structure that can provide improved voice coil motor force constant (BL) characteristics, such as linearity, while maintaining a magnetic flux density (B) across the length of the air gap for sufficiently linear voice coil travel and without sacrificing efficiency of the loudspeaker.

SUMMARY

A loudspeaker with improved performance characteristics provides magnetic flux from split multiple magnets to drive voice coils generating sound in a reduced weight package. Improved performance characteristics may be a result of an improved BL linearity. Improved BL linearity can be achieved with or without the weight reduced package. In one example, the loudspeaker includes a magnet structure having a core, first and second magnets, a magnet housing, a core cap, and a voice coil gap. The first and second magnets may be positioned so that the polarity of the first and second magnets may be aligned in the same direction. The voice coil gap may be formed between the magnet housing and the core cap. The first and second magnets may be coupled to the core. The core height can be greater than a combined height of the first and second magnets. Magnetic flux produced by the first and second magnets may be combined, directed, and/or concentrated by the core cap and magnet housing within the voice coil gap. At least portions of a voice coil may be positioned within the voice coil gap, and a diaphragm may be coupled to the voice coil.

In another example, a bucking magnet assembly can be positioned relative to a magnet structure so that a greater portion of the magnetic flux generated by the magnet structure is contained within the voice coil gap. The bucking magnet assembly can improve the accuracy of voice coil movement and the overall performance of the loudspeaker. The bucking magnet assembly can have a bucking core coupled to split multiple magnets. A first and second bucking magnets can be positioned so that a polarity may be aligned in a same direction. The polarity of the first and second bucking magnets can be opposite to a polarity of the magnet structure. The bucking magnet assembly with the first and second bucking magnets may push the fringe field of the top of the bucking magnet assembly above the voice coil travel range, and can reduce stray magnetic fields.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
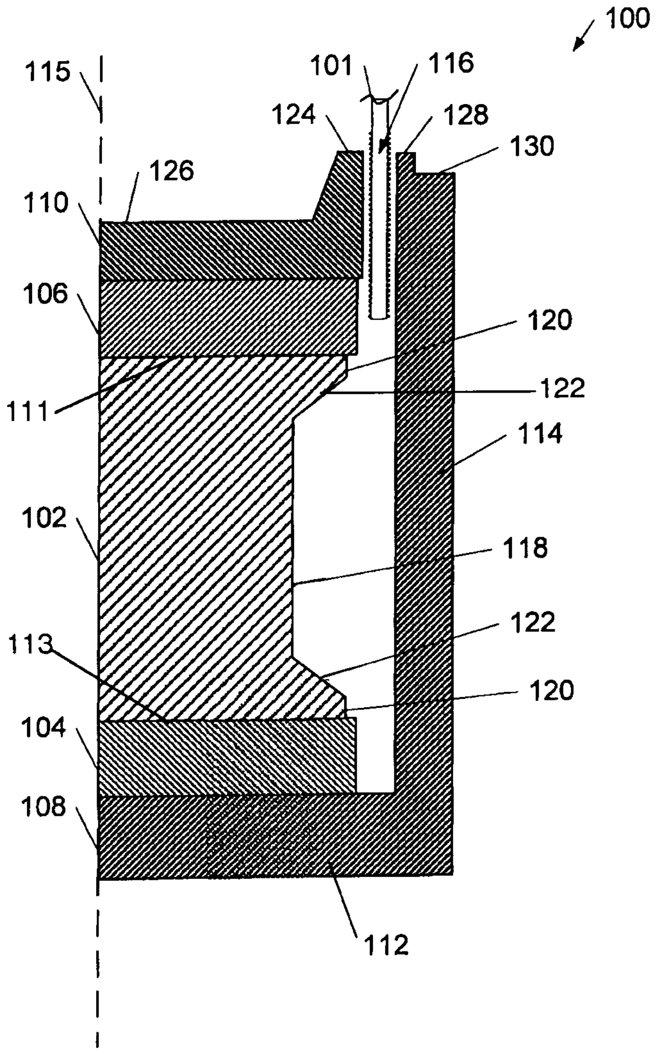
FIG. 1 illustrates a cross-section of a portion of a magnet structure for a loudspeaker.

FIG. 1 illustrates a first example of a cross-section of a portion of a magnet structure 100 for a loudspeaker with a voice coil 101. The magnet structure 100 may include a core 102, a first magnet 104, a second magnet 106, a magnet housing 108, and a core cap 110. The magnet housing 108, also called a shell pot, may include a base 112 and an extension 114. The base 112 of the magnet housing 108 can be coupled to the first magnet 104 and can extend substantially perpendicular to a central axis 115 of the magnet structure 100. The extension 114 of the magnet housing 108 can extend generally in the same direction as the central axis 115, and may even be substantially parallel to the central axis 115. When the magnet structure includes the first and second magnets 104, 106, the magnets can be polarized in the same direction.

When the magnets 104, 106 are polarized in the same direction, the magnets may both contribute to a combined magnetic flux of the magnet structure 100. Magnetic flux is a measure of the quantity of magnetic flow in a magnetic circuit or magnetism. The magnet housing 108 and the core cap 110 may provide a low reluctance path for at least a portion of the combined magnetic flux to channel through. In addition, the core 102 positioned between the magnets 104, 106 also provides a low reluctance path for the combined magnetic flux. A magnetic circuit may be formed by the magnets 104, 106 through the core 102, the magnet housing 108, the core cap 110, and a voice coil gap 116. The voice coil gap 116 can be located at a periphery of the magnet structure 100. In particular, the voice coil gap 116 can be formed between the inner periphery of the extension 114 of the magnet housing 108 and the outer periphery of the core cap 110. The voice coil gap 116 can be sized to receive the voice coil 101.

The core 102, the magnet housing 108, and the core cap 110 may be structured and arranged such that the magnetic flux is combined, directed, and/or concentrated through the voice coil gap 116. For example, the core 102 may include a first end 111 and a second end 113, a centrally located first part 118 and a second part 120 located at opposite ends of the first part 118 adjacent the first and second ends 111, 113. Both parts 118, 120 may be concentric with the central axis 115. The central first part 118 may be formed to be smaller in diameter than the second part 120, which smaller diameter may extend over half of the height of the core 102 measured between the ends 111 and 113. The smaller diameter of the first part 118 can provide an increased distance between a substantial surface area of the core 102 and the magnet housing 108 when compared to the voice coil gap 116. The outer portion of the first part 118 of the core 102 in FIG. 1 can include angled regions 122 adjacent the first and second ends 111, 113 to assist in combining, directing, and/or concentrating the magnetic flux through the core 102 into the magnets 104, 106, as well as reducing the weight of the core 102. In this example, the combination of the first part 118 and the second parts 120 may form a spool shape about the central axis 115. The shape and size of the core 102 can provide a sufficient magnetic reluctance path for all of the flux potential of the magnets 104, 106 to flow through the magnetic circuit without having excess material in the core, resulting in a lighter weight core. This "strategic saturation" of the core 102 can also minimize the inductive effects that the core has on the voice coil 101. The shape and size of the core 102 is also configured to keep the magnetic flux in the core 102 from undesirably jumping across to the magnet housing 108.

In FIG. 1, an outer end portion 124 of the core cap 110 can extend higher relative to a middle portion 126 to focus the magnetic flux into the voice coil gap 116. The radial thickness of the core cap 110 may also vary, such as tapering, from the end of the end portion to the middle portion. The size and shape of the core cap 110 can also minimize the inductive effects that the core has on the voice coil 101 as well as make it a lighter weight. In other examples, the core cap 110 may be solid, rather than internally cored out.

The end of the extension 114 of the magnet housing 108 can have a stepped shape with an inner portion 128 extending beyond an outer portion 130. The inner portion 128 of the end of the extension 114 can help direct the magnetic flux into the voice coil gap 116. The magnetic flux may also be combined, directed, and/or concentrated using other shapes and thicknesses of the core 102, magnet housing 108, and core cap 110.

In FIG. 1, the first magnet 104 is coupled to a first planar surface of the core 102 and the second magnet 106 is coupled to a second planar surface of the core 102. The first and second planar surfaces may be opposite one another on the core 102. The outer diameter of the core 102 may be less than the outer diameter of at least one of the magnets 104, 106. One benefit of having the outer diameter of the magnet greater than the outer diameter of the core 102 is to provide some mechanical clearance for a bonding adhesive to squeeze-out. In other examples, each of the magnets 104, 106 and the core 102 may have the same outer diameter, although it is appreciated by one skilled in the art that the outer diameters may each be different. This may also be the case for the relationship of the outer diameter of the magnets 104, 106 and the core cap 110. The height of each of the magnets 104, 106 may be the same or may be different relative to each other. The magnets are preferably substantially less than the height of the core 102. In one example, the total height of both magnets combined can be up to about 50% the total height of the core 102. In this example, the split magnet design shown in FIG. 1 can allow the use of two relatively thin magnets coupled to a relatively thick core in place of one thick magnet. The relative size of the magnets, core, and core caps can be determined according to specific requirements of a particular application. The power of the magnets may be the same of different relative to each other. When the magnet power is different, it is desirable to put the more powerful magnet adjacent the core cap to enhance the magnetic flux in the voice coil gap.

The core 102 may be solid or alternatively include an orifice extending through an intermediate portion thereof to make the core even more light weight. An orifice can extend through portions of the magnet structure 100, including at least one of the core 102, the magnets 104, 106, the magnet housing 108, and the core cap 110 to allow support of the magnet structure 100 in a loudspeaker and venting. Components of the magnetic structure 100 may be concentric and symmetric about the central axis 115 of the magnet structure 100 or may be non-concentric and non-symmetric.

In FIG. 1, the voice coil 101, which can be coupled to a diaphragm (not shown) of the loudspeaker, can be positioned in the voice coil gap 116. The position of the voice coil 101 relative to the voice coil gap 116 is shown an overhung position where one end of the voice coil can enter the voice coil gap, although the position can be underhung where one end of the voice coil can exit the gap, or the voice coil can travel such that neither ends leave the gap. The dimensions of the voice coil 101 and the diaphragm may be of any dimension, and the dimensions may be scaled together or separately to attain desired loudspeaker performance and mechanical requirements. A long throw voice coil for a subwoofer or woofer may be positioned in the relatively deep or high voice coil gap 116, for example. A suspension (not shown) coupled to the diaphragm allows the voice coil 101 and the diaphragm to reciprocate axially along the central axis 115 of the loudspeaker. The voice coil 101 may include windings wound cylindrically around a former. The former may include any suitable material such as aluminum, copper, plastic, paper, composite, or other rigid materials. The windings may include wire made from copper, aluminum, or other suitable conductive materials, and may be attached to the former using an adhesive. The number of windings encircling the former may depend upon loudspeaker size and the desired loudspeaker performance characteristics.

The voice coil 101 may reciprocate axially during operation when there is interaction in the voice coil gap 116 between the magnetic flux from the magnets 104, 106 and current flowing through the voice coil 101. The magnetic flux is substantially combined, directed, and/or concentrated in the voice coil gap 116. Current flowing through the voice coil 101 may come from an input audio signal. The input audio signal may be an analog electrical signal provided by an amplifier, a crossover, or other suitable source. The current may interact with the magnetic flux in the voice coil gap 116, the voice coil 101, and the attached diaphragm to vibrate and oscillate linearly independently in response to the interaction. Audible sound may be produced by the independent movement of air caused by the diaphragm.

Figure 8A:
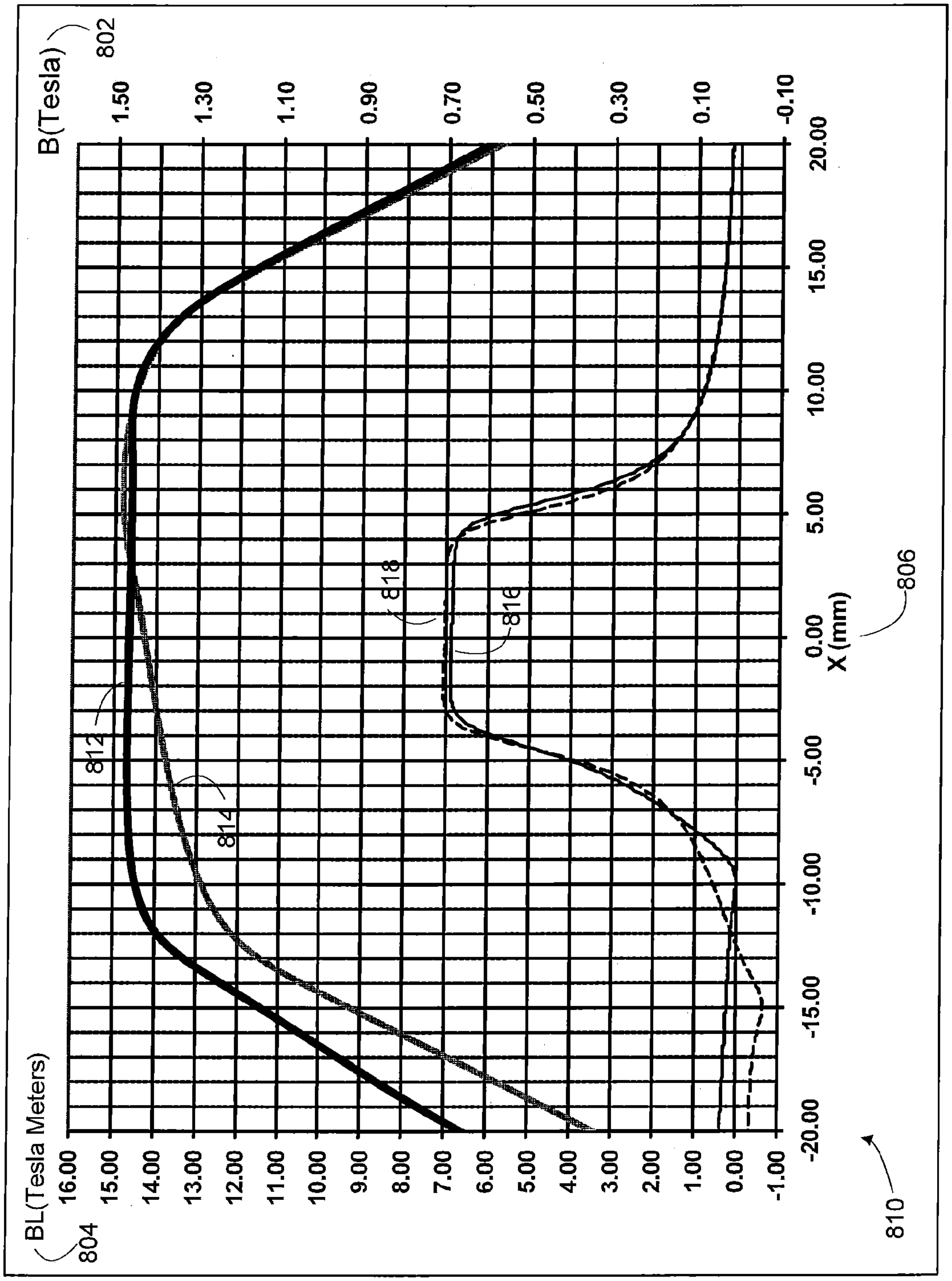
FIGS. 8A, 8B, 8C, and 8D are graphs comparing differences of a magnetic flux density (B) and a voice coil motor force constant (BL) versus a voice coil position in a voice coil gap relative to a rest position of the voice coil for a magnet structure and another magnet structure.

While the combined height of the combination of the base 112 of the magnet housing 108, the core 102, and the magnets 104, 106 may be similar to the overall height of a conventional magnet structure including a single relatively thick magnet supported by a magnetically conductive pedestal, the performance of a loudspeaker utilizing the magnet structure 100 can still be further improved. For example, the performance can be improved by reducing the parasitic fringe magnetic field that is present when using a single taller magnet supported by a magnetically conductive pedestal. Furthermore, a curve plotting the voice coil motor force constant (BL) of the magnet structure 100 versus the position of the voice coil in the voice coil gap 116 may have a more symmetric and linear characteristic, as shown in FIG. 8A. Decreased distortion and improved overall performance of the loudspeaker over a wider frequency range may result.

Figure 2:
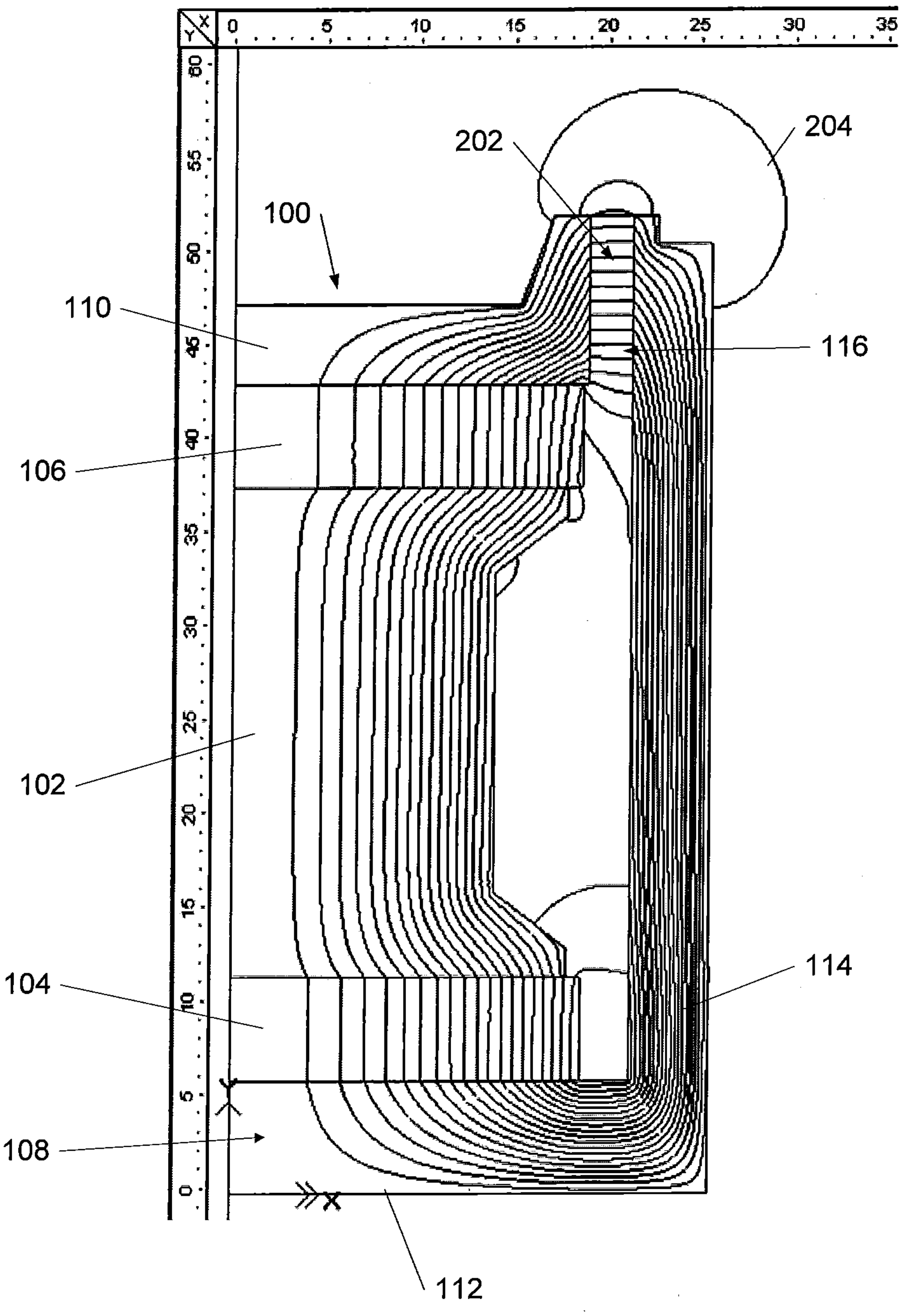
FIG. 2 illustrates the magnetic flux for the magnet structure of FIG. 1.

FIG. 2 illustrates the magnetic flux for the example magnet structure 100 of FIG. 1, with the voice coil removed. The magnets 104, 106 are polarized in the same direction to direct, combine, and/or concentrate their magnetic flux in the voice coil gap 116. As can be seen in the figure, there is a higher concentration of magnetic flux lines 202 in the voice coil gap 116, compared to the magnetic flux lines elsewhere in the magnet structure 100. A smaller concentration of stray magnetic flux lines 204 external to the magnet structure 100 are also shown in FIG. 2. At least one of the core 102, the magnet housing 108, and the core cap 110 are arranged and configured such that the magnetic flux of the magnets 104, 106 is concentrated in the voice coil gap 116. As previously described, the magnet structure 100 may drive a voice coil positioned in the voice coil gap 116.

Figure 3:
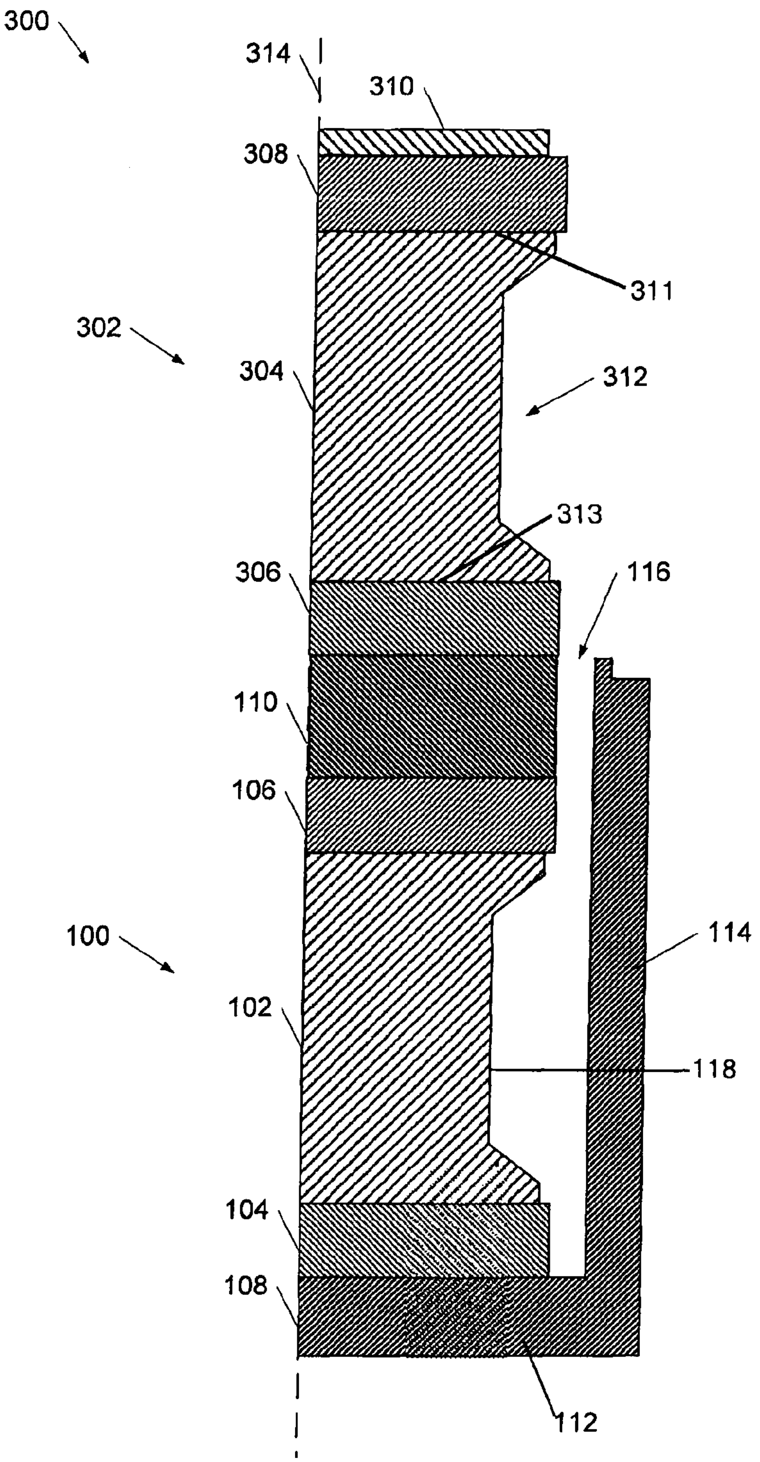
FIG. 3 illustrates a cross-section of a portion of another magnet structure for a loudspeaker.

FIG. 3 illustrates a cross-section of a part of another example of a magnet structure assembly 300 for a loudspeaker. The magnet structure assembly 300 can include one of more of the features of the magnet structure 100 described herein and a bucking magnet assembly 302 that is coupled to the magnet structure 100. The bucking magnet assembly 302 can assist in containing the magnetic field generated by the magnet structure 100. The bucking magnet assembly 302 may include at least one of a core 304, a first magnet 306, a second magnet 308, and an optional top cap 310. However, the polarity of the magnets 306, 308 of the bucking magnet assembly 302 is opposite of the polarity of the magnets 104, 106 of the magnet structure 100.

The magnets 306, 308 can contribute to a combined magnetic flux of the bucking magnet assembly 302. The core 304 and the top cap 310 can provide a low reluctance path for portions of the combined magnetic flux of the magnets 306, 308 to flow through. In the absence of the top cap 310, the flux from the magnet 308 may travel through air. The core 304 and top cap 310 may be shaped and sized to concentrate, combine, and/or direct the magnetic flux of the magnets 306, 308 so that the magnetic field generated by the magnet structure 100 is contained. The core 304 may even be shaped and sized similar to the core 102 for the same function as described herein. For example, the outer portion of the core 304 can include a central portion 312 of reduced diameter to assist in combining, directing, and/or concentrating the magnetic flux through the core 304, as well as reducing the weight of the core 304. The reduced diameter central portion 312 may extend over half the height of the core 304, the height being measured between ends 311 and 313 of the core 304. The magnetic flux may be combined, directed, and/or concentrated using other shapes and thicknesses of the core 304 and top cap 310.

The first magnet 306 can be coupled to a first planar surface of the core 304 and the second magnet 308 can be coupled to second planar surface of the core 304 that is opposite of the first planar surface. The outermost diameter of the core 304 may be less than the outer diameter of at least one of the magnets 306 and 308. The height of the magnets 306 and 308 may be the same or different as one another and the magnets 104 and 106. The height of each of the magnets 306, 308 may be the same or may be different but each individual magnet should be substantially less than the core height. In one example, the total height of both magnets combined can be up to about 50% the total height of the core 102. In this example, the split magnet bucking assembly design shown in FIG. 3 can allow the use of two relatively thin magnets coupled to a relatively thick core in place of one thick magnet. The power of the magnets may be the same of different. When different, it is desirable to put the more powerful magnet (or thicker magnet) adjacent the core cap to enhance the magnetic flux in the voice coil gap.

The core 304 may be solid, and at least one of the core, the magnets and top cap, can include an orifice to allow support of the magnet structure 300 in a loudspeaker. The magnet structure 300, including the magnet structure 100 and the bucking magnet assembly 302 may be concentric and symmetric about an axis of symmetry 314 of the magnet structure 300. The magnet structure 300 may also be non-concentric and non-symmetric.

The bucking magnet assembly 302 may further improve the performance of a loudspeaker that includes only the magnet structure 100 or any other magnet structures such as a single magnet design as described below. Using a bucking magnet assembly 302 can allow a greater portion of the magnetic field generated by a magnet structure to be contained within the magnet structure. This can improve the accuracy of voice coil movement and the overall performance of the loudspeaker. In addition, the bucking magnet assembly 302 may be used for a second loudspeaker motor, such as a tweeter, a midrange coaxial design, or any other dual loudspeaker design. Further, use of the bucking magnet assembly 302 may push the fringe field of the top of the bucking magnet assembly 302 above the voice coil travel range when compared to having a single bucking magnet of the combined thicknesses of the two magnets 306 and 308 placed directly on the core cap, as discussed with reference to FIGS. 4 and 6.

Figure 4:
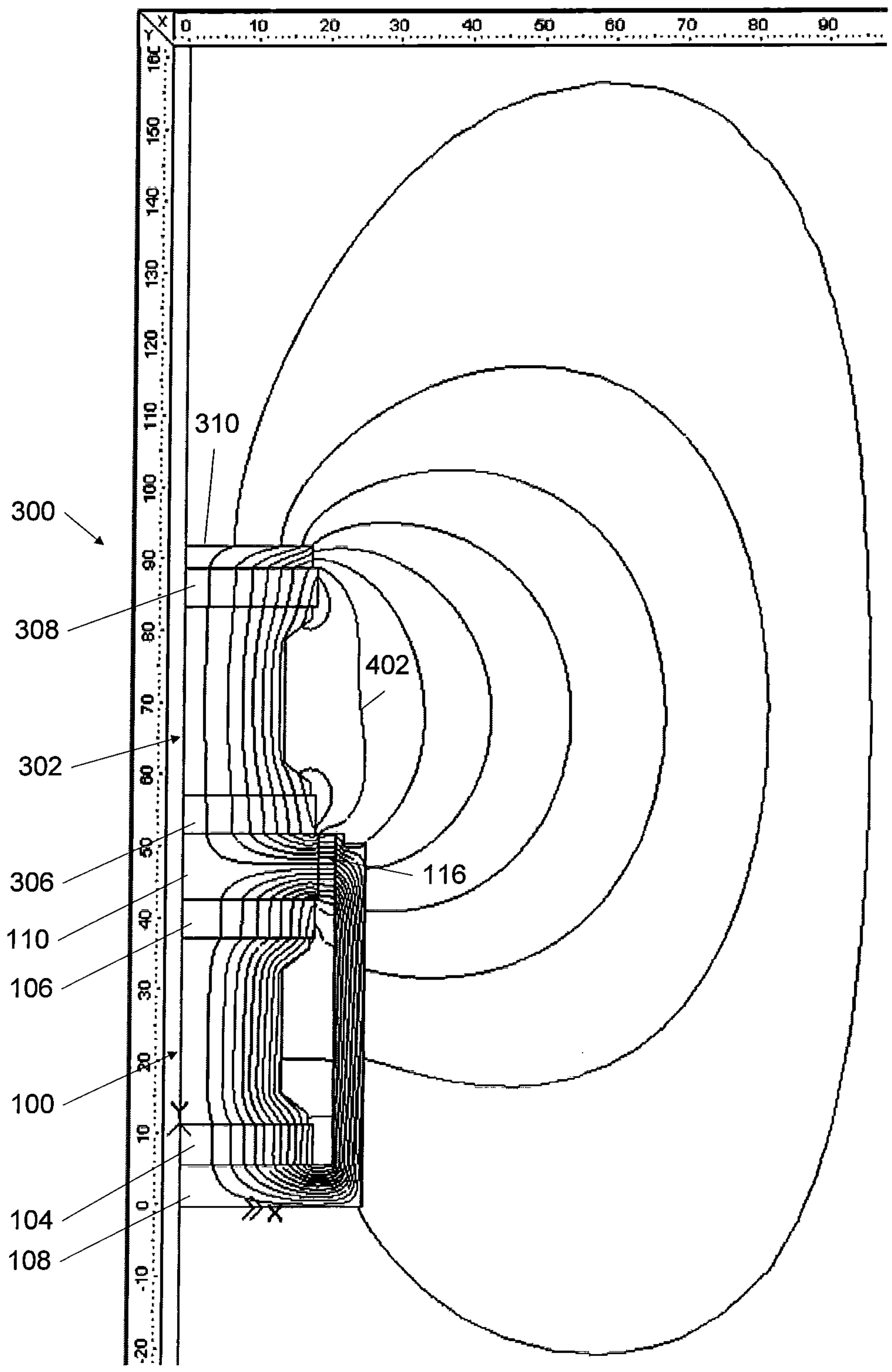
FIG. 4 illustrates the magnetic flux for the magnet structure of FIG. 3.

FIG. 4 illustrates the magnetic flux for the example magnet structure 300 of FIG. 3. The magnets 306, 308 of the bucking magnet assembly 302 can be polarized in the same direction to combine, direct, and/or combine their magnetic flux for containing the magnetic flux generated by the magnet structure 100. In particular, the magnets 306, 308 can generate the magnetic flux, represented by lines 402, external to the magnet structure 300 such that stray magnetic flux from the magnet structure 100 are forced to stay within the magnet structure 100, and in particular in the voice coil gap 116. To illustrate, the stray magnetic flux lines 204 shown in FIG. 2 are suppressed and do not appear in FIG. 4 because the bucking magnet assembly 302 can substantially contain them within the magnet structure 100.

Figure 5:
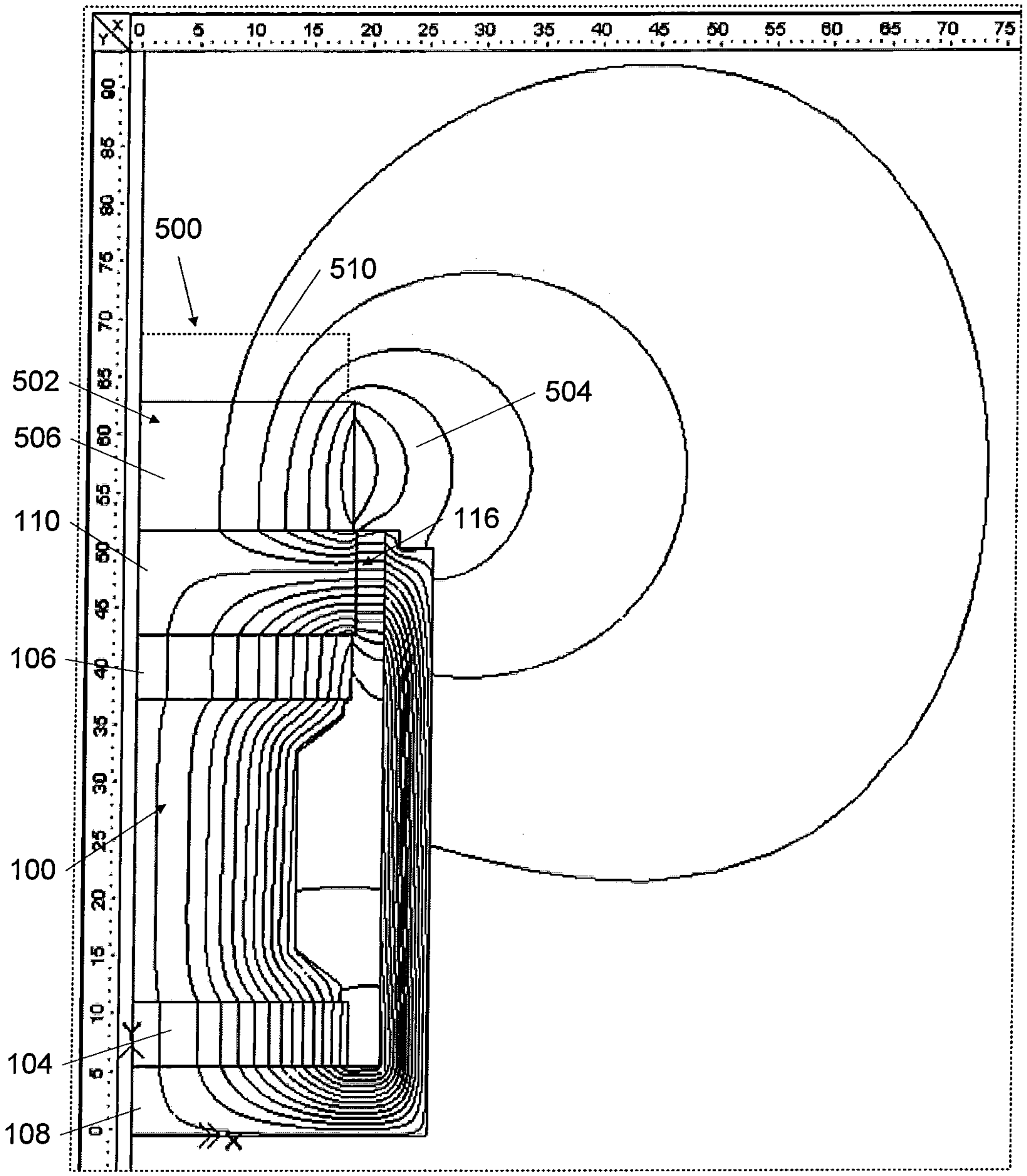
FIG. 5 illustrates the magnetic flux for another magnet structure for a loudspeaker.

FIG. 5 illustrates a cross-section of a part of yet another magnet structure assembly 500 for a loudspeaker, and the magnetic flux for the magnetic structure 500. The magnet structure assembly 500 can include the magnet structure 100 described in FIG. 1 and a bucking magnet assembly 502 coupled to the magnet structure 100. Similar to the example of FIG. 3, the bucking magnet assembly 502 assists in containing the magnetic field generated by the magnet structure 100. The bucking magnet assembly 502 may include a third magnet or bucking magnet 506 and an optional top cap 510 (shown in dashed lines). The bucking magnet 506 can be polarized in the opposite direction of the first and second magnets 104 and 106 in order to direct magnetic flux of the first and second magnets 104 and 106 into the voice coil gap 116. In particular, the magnet 506 can generate the magnetic flux, represented by lines 504, external to the magnet structure 100 such that stray magnetic flux from the magnet structure 100 is forced to stay within the magnet structure 100, and in particular in the voice coil gap 116. The top cap 510 may direct the magnetic flux of the bucking magnet 506 to minimize travel through air. In the absence of the top cap 510, more of the magnetic flux from the magnet 506 may travel through air.

The bucking magnet 506 may be coupled to a planar surface of the core cap 110 opposite the second magnet 106. The top cap 510 (when present) may be coupled with the bucking magnet 506 on a planar surface opposite the core cap 110. The outer diameter of the bucking magnet 506 may be less than the outer diameter of the core cap 110, and the outer diameter of the top cap 501 may be less than the bucking magnet 506. The height of the bucking magnet 506 and the top cap 510 combined, may be substantially the same as the height of the combination of the magnets 104 and 106. Alternatively, the height of the bucking magnet 506, absent the top cap 510, may be substantially the same as the combination of the magnets 104 and 106.

Figure 6:
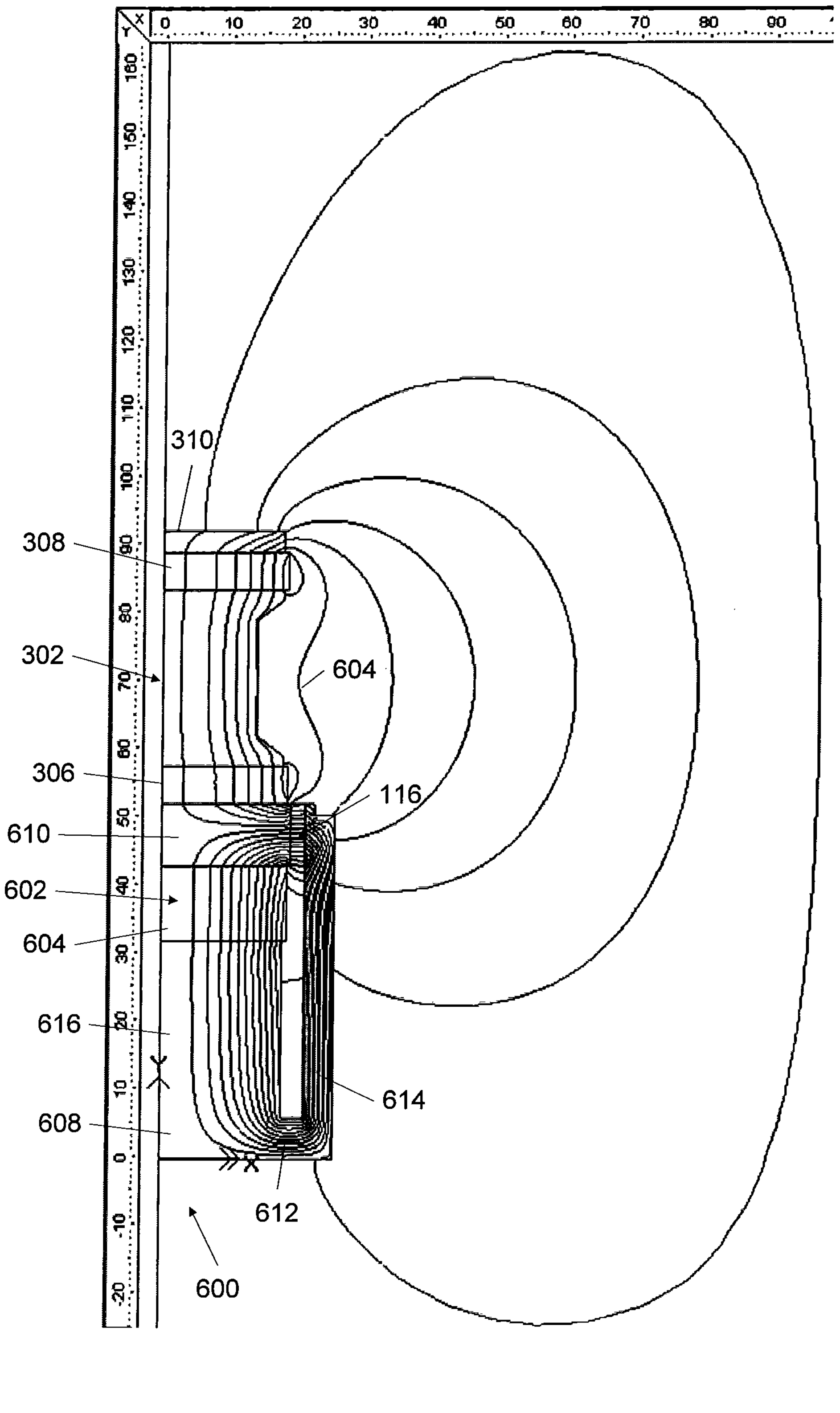
FIG. 6 illustrates the magnetic flux for another magnet structure for a loudspeaker.

FIG. 6 illustrates a cross-section of a part of yet another magnet structure assembly 600 for a loudspeaker, and the magnetic flux for the magnetic structure 600. The magnet structure assembly 600 may include a magnetic structure 602 that can include a magnet 604, a magnet housing 608, and a core cap 610 spaced from the housing to define the voice coil gap 116. The magnet housing 608, also called a shell pot, may include a base 612 and an extension 614. Extending from the base 612 is a pedestal 616 or core having a surface for attachment to the magnet 604. The magnet structure assembly 600 also includes the bucking magnet assembly 302 of FIG. 3 coupled to the core cap 610. The bucking magnet assembly 302 assists in containing the magnetic field generated by the magnet structure assembly 600.

The base 612 of the magnet housing 608 can extend substantially perpendicular to a central axis, and the pedestal 616 can extend along the central axis. The extension 614 can extend generally in the same direction as the central axis, and may even be substantially parallel thereto. The polarity of the magnets 306, 308 of the bucking magnet assembly 302 can be opposite of the polarity of the magnet 604 of the magnet structure assembly 600. The magnets 306, 308 of the bucking magnet assembly 302 can be polarized in the same direction to combine, direct, and/or combine their magnetic flux for containing the magnetic flux generated by the magnet structure assembly 600. In particular, the magnets 306, 308 can generate the magnetic flux, represented by lines 604, external to the magnet structure 600 such that stray magnetic flux from the magnet structure 602 is forced to stay within the magnet structure 602, and in particular in the voice coil gap 116.

Figure 7:
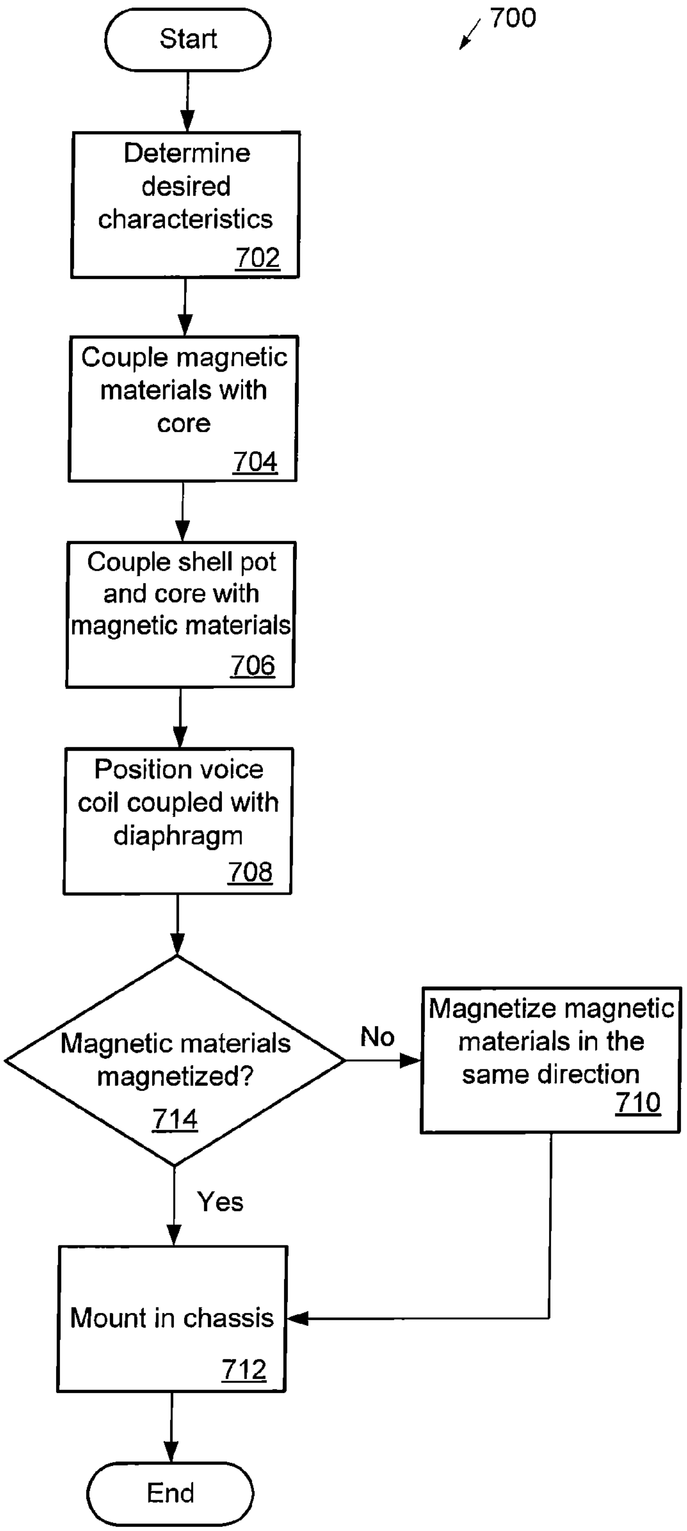
FIG. 7 illustrates an example process to manufacture a loudspeaker.

FIG. 7 illustrates an example process 700 to manufacture a loudspeaker, such as the loudspeakers including the example magnet structures or the bucking magnet structure assemblies of the figures. The desired audio characteristics, material requirements, and physical requirements of the loudspeaker may be determined in Act 702. For example, audio characteristics may include power dissipation, frequency ranges, impedance, and other characteristics. The physical requirements of a loudspeaker may include the mass or dimensional requirements for a specific application, environment, or manufacturing process.

In Act 704, first and second magnetic materials may be coupled with a core composed of a low reluctance magnetically conductive material. The magnetic materials may be non-magnetized when they are coupled with the core, or may already be magnetized. If the magnetic materials are initially non-magnetized, the coupling of the magnetic materials with the core is simplified. The initially non-magnetized magnetic materials will not interact magnetically with one another or the core during the coupling in Act 704. The core may be solid and be shaped to allow direction, combination, and/or concentration of magnetic flux.

In Act 706, a magnet housing and a core cap may be coupled with the first and second magnetic materials. The magnet housing and core cap may be of a ring or annular shape, and may be composed of a low reluctance magnetically conductive material. The magnet housing and core cap may be adapted to combine, direct, and/or concentrate a magnetic flux into a voice coil gap formed by the magnet housing and core cap. The voice coil gap formed between the magnet housing and the core cap is at an inner periphery of the magnet housing and at an outer periphery of the core cap. In Act 708, a voice coil coupled to a diaphragm may be positioned in the voice coil gap. The voice coil may be positioned such that the magnetic flux of the magnetized first and second magnetic materials will interact with current flowing through the voice coil and allow reciprocating axial movement of the voice coil and the attached diaphragm. The voice coil may be a subwoofer voice coil, or may be another type of voice coil.

At Act 714, it is determined whether the magnetic materials are magnetized. If the magnetic materials are magnetized and their polarities are aligned in the same direction, then the method 700 may continue to Act 712. If the magnetic materials are not initially magnetized, then the method 700 may continue to Act 710. In Act 710, the first and second magnetic materials may be magnetized such that the polarities of the magnets are aligned in the same direction. The first and second magnetic materials were coupled to the core in Act 704, and the magnet housing and the core cap were coupled to the first and second magnetic materials in Act 706. Therefore, the magnetization of the first and second magnetic materials may be performed after assembly of the magnet structure. The magnetization of the first and second magnetic materials in Act 710 may be performed simultaneously. Magnetizing the first and second magnets in this fashion allows both magnets to combine their magnetic flux in the gaps and provide for more accurate voice coil movement in the gaps. In addition, magnetization after assembly avoids the difficulty of aligning the components despite the magnetic attraction of the core cap, core, and magnet housing to the first and second magnetic materials. The loudspeaker may be assembled by mounting the magnet structure with the magnetized magnetic materials, the voice coils, and the diaphragm in a loudspeaker chassis in Act 712, along with a suspension, wiring, and other components of the loudspeaker.

In one example of a method of manufacturing a magnet structure of a loudspeaker, the steps can include providing at least one a core having a first core surface and a second core surface, a magnet housing, and a core cap. A first magnetic material can be coupled to the first core surface, and a second magnetic material can be coupled to the second core surface. The core height can be greater than a combined height of the first magnetic material and the second magnetic material. The magnet housing can be coupled to the first magnetic material. The core cap can be coupled to the second magnetic material such that the core cap and the magnet housing can form a voice coil gap in which a voice coil is positionable. The first and second magnetic materials may be magnetized such that a polarity of the first magnetic material is aligned in a same direction as a polarity of the second magnetic material. In another example, the method steps can include providing at least one of a magnet assembly having a core cap, a magnetic material having a polarity in a first direction, and a magnet housing positioned relative to the core cap to form a voice coil gap. A bucking core can be provided having a first bucking core surface and a second bucking core surface. A first bucking magnetic material can be coupled to the first bucking core surface, and a second bucking magnetic material can be coupled to the second bucking core surface. The first and second bucking magnetic materials can be magnetized such that a polarity of the first bucking magnetic material is aligned in a same direction as a polarity of the second bucking magnetic material. The polarity of the first and second bucking magnetic materials can be opposite to the polarity of the magnetic material of the magnet assembly. The first bucking magnetic material can be coupled to the core cap.

FIGS. 8A, 8B, 8C, and 8D present graphs comparing the differences of the magnetic flux density (B—Tesla; right hand y-axis (802)) and the voice coil motor force constant (BL—Tesla Meters; left hand y-axis (804)) versus the voice coil position in the voice coil gap relative to a center of a core (positive or negative millimeters; x-axis (806)) for a magnet structure and another control magnet structure each being relatively the same size. The center of the core can be a rest position of the voice coil without an input signal. Positive distance indicates the voice coil moving away from the rest position and away from the magnet housing base in response to the voice coil with an input signal, and a negative distance indicates the voice coil moving away from the rest position toward the magnet housing base in response to the voice coil with an input signal.

In FIG. 8A, for example, the graph 810 shows the performance differences between the magnet structure 100 of FIG. 1 with the multiple magnets and a control magnet structure having a single thick magnet supported by a magnetically conductive pedestal. The magnet structure 100 can provide a more linear or constant BL curve 812 (about 14.67 Tesla Meters) between a minimum and maximum distance of travel (about negative 10 mm to about positive 10 mm). In comparison, the control magnet structure provides a variable BL curve 814 (about 12.9 Tesla Meters to about 14.8 Tesla Meters) between a minimum and maximum distance of travel (about negative 10 mm to about positive 10 mm). The magnetic flux density 816 of the magnet structure 100 (about 0.69 Tesla) can be substantially the same as the magnetic flux density 818 of the control magnet structure (about 0.71 Tesla). The magnet structure 100 can have an improved BL linearity within the voice coil gap, especially an improved BL linearity when the voice coil is moving away from the rest position in a negative direction as indicated by the performance difference in the curve 812 and the curve 814.

Figure 8B:
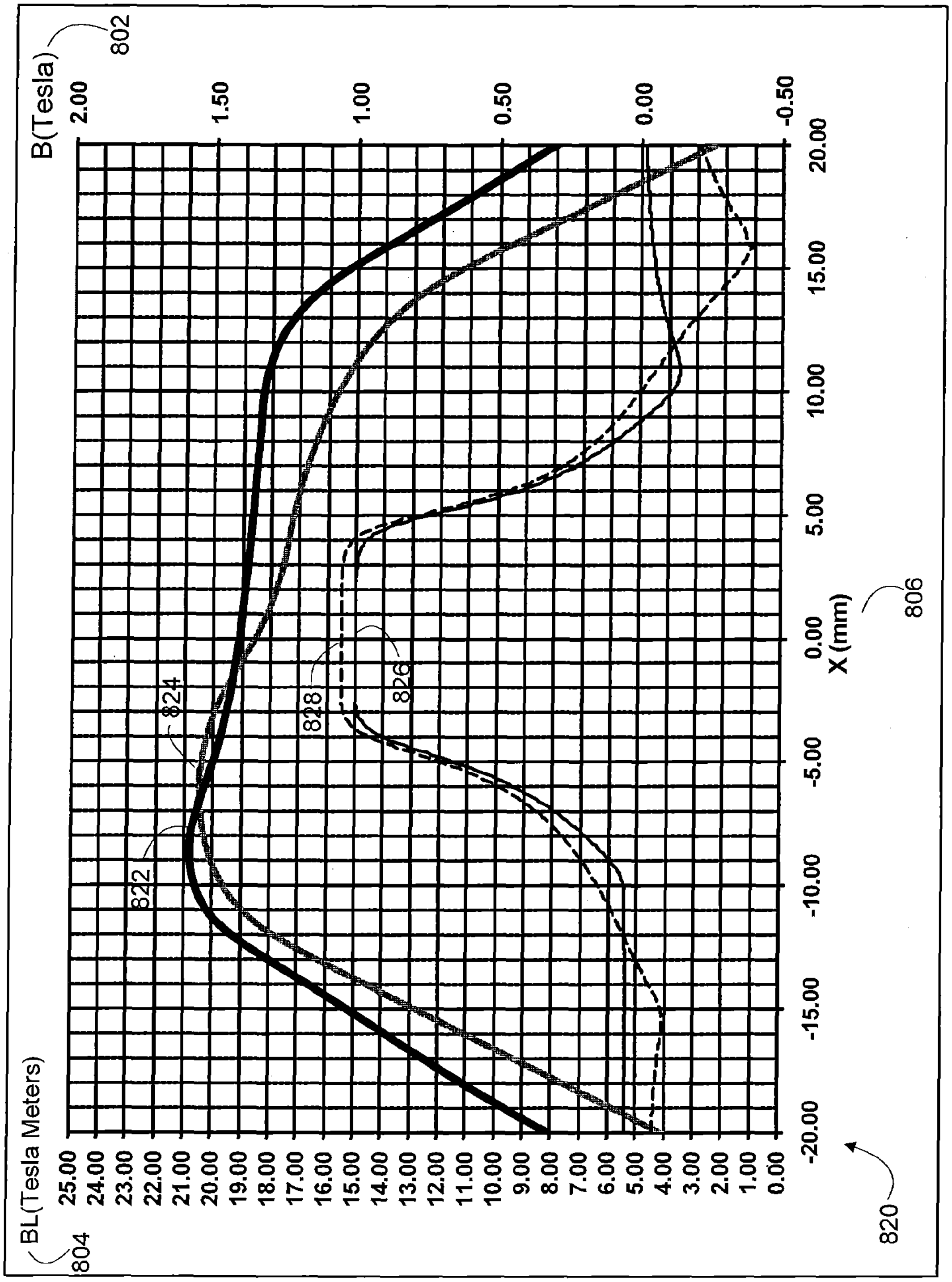

In FIG. 8B, for example, the graph 820 shows the performance differences between the magnet structure 300 of FIG. 3 with the multiple magnets and a multiple magnet bucking magnet assembly, and a control magnet structure having a single thick magnet supported by a magnetically conductive pedestal and a single magnet bucking assembly. The magnet structure 300 can provide a more linear or constant BL curve 822 (about 20.2 Tesla Meters to about 18.1 Tesla Meters, maximum of 20.8 Tesla Meters) between a minimum and maximum distance of travel (about negative 11 mm to about positive 11 mm). In comparison, the control magnet structure provides a variable BL curve 824 (about 19.0 Tesla Meters to about 15.2 Tesla Meters, maximum of 20.5 Tesla Meters) between a minimum and maximum distance of travel (about negative 11 mm to about positive 11 mm). The magnetic flux density 826 of the magnet structure 300 (about 1.0 Tesla) can be substantially the same as the magnetic flux density 828 of the control magnet structure (about 1.05 Tesla). The magnet structure 300 can have an improved BL linearity within the voice coil gap, especially an improved BL linearity when the voice coil is moving away from the rest position in a positive direction as indicated by the performance difference in the curve 822 and the curve 824.

Figure 8C:
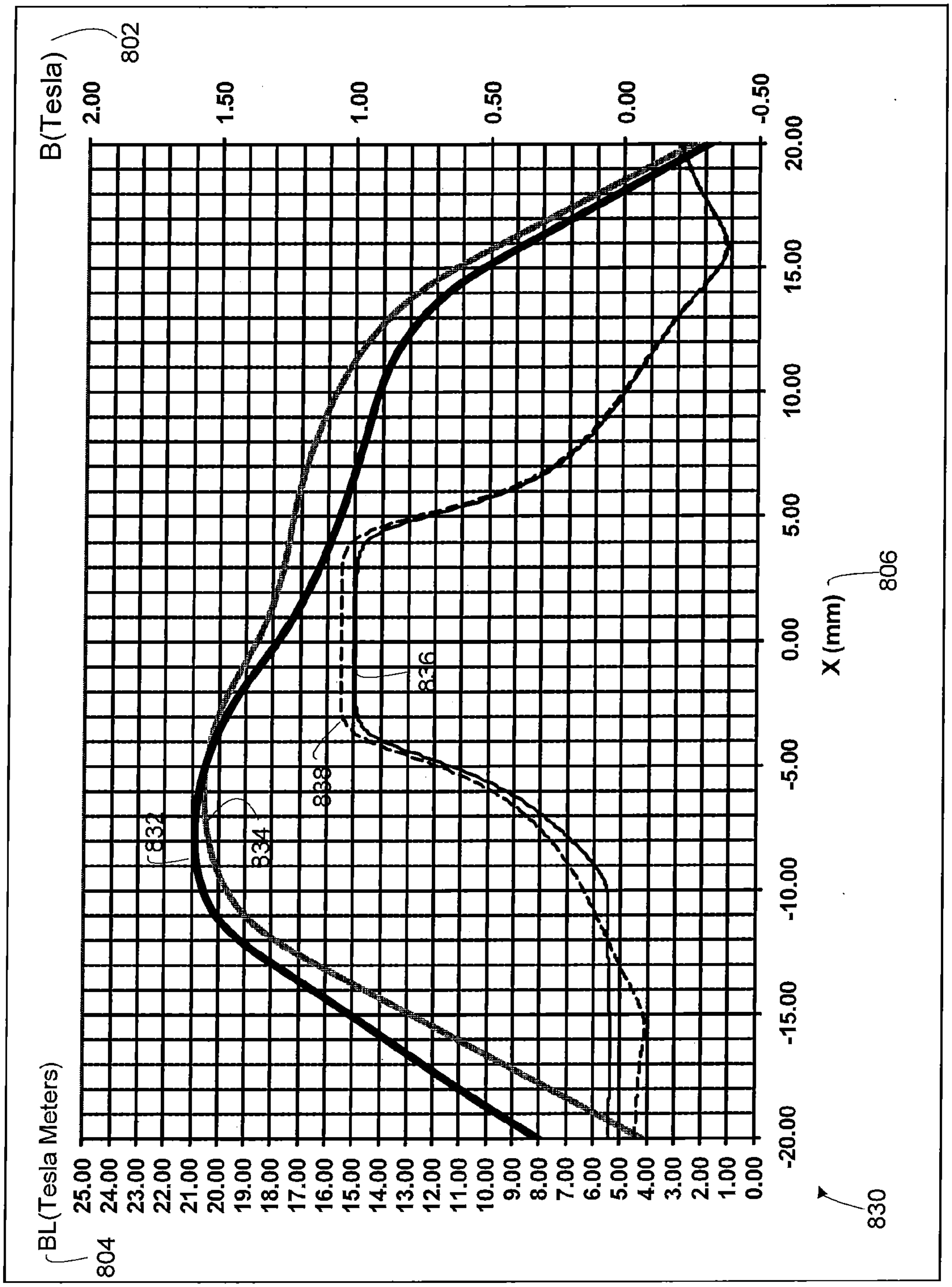

In FIG. 8C, for example, the graph 830 shows the performance differences between the magnet structure 500 of FIG. 5 with the multiple magnets and a single magnet bucking magnet assembly, and a control magnet structure having a single thick magnet supported by a magnetically conductive pedestal and a single magnet bucking magnet assembly. The magnet structure 500 can provide an improved BL curve 832 (about 20.1 Tesla Meters to about 20.3 Tesla Meters, maximum of 20.9 Tesla Meters) between a minimum and maximum distance of travel (about negative 11 mm to about negative 5.5 mm) In comparison, the control magnet structure provides a variable BL curve 834 (about 19.0 Tesla Meters to about 20.3 Tesla Meters, maximum of 20.5 Tesla Meters) between a minimum and maximum distance of travel (about negative 11 mm to about negative 5.5 mm). The magnetic flux density 836 of the magnet structure 500 (about 1.0 Tesla) can be substantially the same as the magnetic flux density 838 of the control magnet structure (about 1.05 Tesla).

Figure 8D:
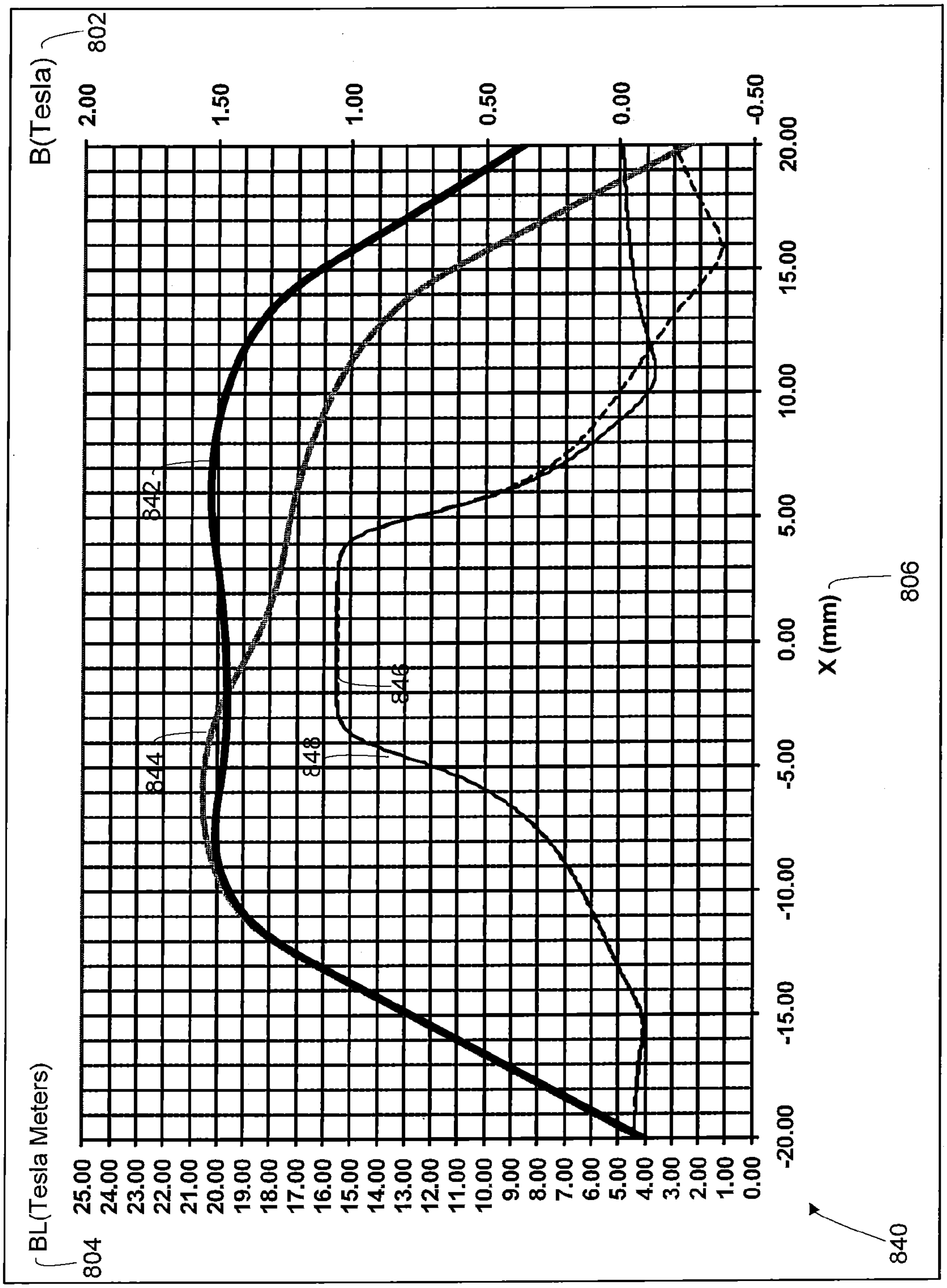

In FIG. 8D, for example, the graph 840 shows the performance differences between the magnet structure 600 of FIG. 6 with a single magnet supported by a magnetically conductive pedestal and a multiple magnet bucking magnet assembly, and a control magnet structure having a single thick magnet supported by a magnetically conductive pedestal and a single magnet bucking magnet assembly. The magnet structure 600 provides a more linear or constant BL curve 842 (about 19.5 Tesla Meters to about 19.8 Tesla Meters, maximum of 20.3 Tesla Meters) between a minimum and maximum distance of travel (about negative 10 mm to about positive 10 mm). In comparison, the control magnet structure provides a variable BL curve 844 (about 19.7 Tesla Meters to about 15.7 Tesla Meters, maximum of 20.5 Tesla Meters) between a minimum and maximum distance of travel (about negative 10 mm to about positive 10 mm) The magnetic flux density 846 of the magnet structure 600 (about 1.05 Tesla) can be substantially identical to the magnetic flux density 848 of the control magnet structure (about 1.05 Tesla). The magnet structure 600 can have an improved BL linearity within the voice coil gap, especially an improved BL linearity when the voice coil is moving away from the rest position in a positive direction as indicated by the performance difference in the curve 842 and the curve 844.

The magnets described herein may be composed of any permanent magnetic material, including neodymium, ferrite, or any other metallic or non-metallic materials capable of being magnetized to include an external magnetic field. The magnets may be magnetized prior to installation in a loudspeaker, or may be magnetized after installation in a loudspeaker as part of the manufacturing process. The magnets may be disc magnets, circular or annular-shaped ring magnets, or may be other shapes. The components of the magnet structure may be coupled using adhesive, bonding agents, mechanical fasteners, or any other fastening mechanism. The core, the magnet housing, the core cap, and/or the top cap may be composed of a low reluctance magnetic material, including steel, an alloy, and/or any other magnetically conductive materials. The relative size of the magnets, core, and top caps can be determined according to specific requirements of a particular application.

While various embodiments of the invention have been described, it will be apparent to those of ordinary skill in the art that many more embodiments and implementations are possible within the scope of the invention. For example, other configurations, arrangements, and combinations of domes, diaphragms, cones, and/or voice coils for tweeter, midrange, and/or subwoofer drivers may be used with the magnet structures described. Accordingly, the invention is not to be restricted except in light of the attached claims and their equivalents.

I claim:

1. A magnet structure of a loudspeaker, comprising:

a core comprising a first core surface at a first end and a second core surface at a second end;

a first magnet coupled to the first core surface;

a second magnet coupled to the second core surface, where the first magnet and the second magnet are positioned so that a polarity of the first magnet is aligned in a same direction as a polarity of the second magnet, where the core has a height from the first end to the second end greater than a combined height of the first magnet and the second magnet, and where the core has an outer periphery including a central portion of reduced diameter between the first and second ends of the core extending over half of the height of the core;

a magnet housing coupled to the first magnet; and a core cap coupled to the second magnet, where the magnet housing and the core cap are configured to form a voice coil gap radially outside the core cap in which a voice coil is positionable.

2. The magnet structure of claim 1, where the magnet housing comprises a base and an extension extending from the base, the base coupled to the first magnet, the extension spaced radially outside the core cap to form the voice coil gap therebetween.

3. The magnet structure of claim 1, where the core, the first magnet, the second magnet, and the core cap form an axial assembly about a central axis of the magnet structure, the axial assembly sized to fit within the magnet housing.

4. The magnet structure of claim 1, where the voice coil gap is only a single voice coil gap, and the core cap and the magnet housing are configured to concentrate a magnetic flux of the first and second magnets substantially within the single voice coil gap.

5. The magnet structure of claim 4, where the single voice coil gap is formed at one end of the magnet housing.

6. The magnet structure of claim 5, where the second magnet that is closer in proximity to the single voice coil gap than the first magnet has a greater magnetic power than the first magnet.

7. The magnet structure of claim 1, where the combined height of the first magnet and the second magnet is about 50% of the core height.

8. The magnet structure of claim 1, where the end portions of the outer periphery of the core are closer to the magnet housing than the central portion of the outer periphery of the core.

9. The magnet structure of claim 1, further comprising a bucking magnet assembly having at least one magnet positioned to contain a magnetic flux of the magnet structure, the at least one magnet coupled to the core cap, where the at least one magnet is positioned so that a polarity of the at least one magnet is aligned in an opposite direction as the polarity of each of the first and second magnets.

10. The magnet structure of claim 9, where the bucking magnet assembly further comprises: a bucking core having a first bucking core surface and a second bucking core surface; a first bucking magnet coupled to the core cap and a second surface coupled to the first bucking core surface; and a second bucking magnet coupled to the second bucking core surface, where the first and second bucking magnets are positioned so that a polarity of the first bucking magnet is aligned in a same direction as a polarity of the second bucking magnet, and the polarity of the first and second bucking magnets is opposite to the polarity of the first and second magnets of the magnet structure.

11. The magnet structure of claim 10, where the bucking magnet assembly further comprises a top cap coupled to the second bucking magnet.

12. A magnet structure of a loudspeaker, comprising:

at least one magnet;

a magnet housing coupled to the at least one magnet;

a core cap coupled to the at least one magnet, where the magnet housing and the core cap are configured to form a voice coil gap in which a voice coil is positionable;

a bucking magnet assembly positioned to contain a magnetic flux of the magnet structure, the bucking magnet assembly including a bucking core having a first bucking core end surface, a second bucking core end surface, and a bucking core outer periphery including a central portion of reduced diameter between the first and second surfaces of the bucking core, a first bucking magnet having a first surface coupled to the core cap and a second surface coupled to the first bucking core end surface, and a second bucking magnet coupled to the second bucking core end surface, where the bucking core has a height greater than a combined height of the first bucking magnet and the second bucking magnet, and where the reduced diameter central portion extends over half of the height of the bucking core;

where the first and second bucking magnets are positioned so that a polarity of the first bucking magnet is aligned in a same direction as a polarity of the second bucking magnet, and the polarity of the first and second bucking magnets is opposite to a polarity of the at least one magnet of the magnet structure.

13. The magnet structure of claim 12, wherein the bucking magnet assembly further comprises a top cap coupled to the second bucking magnet.

14. The magnet structure of claim 12, where the bucking magnet assembly is positioned external to the magnet housing.

15. The magnet structure of claim 12, where the combined height of the first bucking magnet and the second bucking magnet is about 50% of the bucking core height.

16. A magnet structure of a loudspeaker, comprising:

a magnet assembly and a bucking magnet assembly, the magnet assembly comprising a first magnet having a first polarity and a first magnetic flux, a second magnet having a second polarity and a second magnetic flux, the second polarity aligned in a same direction as the first polarity, a core having a first end coupled to the first magnet, and a second end coupled to the second magnet, a magnet housing coupled to the first magnet, and a core cap coupled to the second magnet, the magnet housing and the core cap being configured to form a voice coil gap radially outside the core cap in which a voice coil is positionable, where a combined magnetic flux of the magnet assembly comprising the first and second magnetic flux flows substantially through the voice coil gap; and the bucking magnet assembly positioned to contain the combined magnetic flux of the magnet assembly, the bucking magnet assembly comprising a third magnet having a third polarity coupled to the core cap of the magnet assembly, a fourth magnet having a fourth polarity, the third polarity being aligned in a same direction as the fourth polarity, a bucking core having a first end coupled to the third magnet, and a second end coupled to the fourth magnet, and a bucking core outer periphery including a central portion of reduced diameter between the first and second bucking core ends, where the bucking core has a height greater than a combined height of the third magnet and the fourth magnet, and where the reduced diameter central portion extends over half of the height of the bucking core;

where the polarity of the third and fourth magnets of the bucking magnet assembly are opposite to the polarity of the first and second magnets of the magnet assembly.

17. The magnet structure of claim 16, where the bucking magnet assembly is positioned external to the magnet housing of the magnet assembly.

18. The magnet structure of claim 16, where the magnet housing comprises a base and an extension extending from the base to form an interior of the magnet housing, the base coupled to the first magnet, the extension spaced from the core cap to form the voice coil gap therebetween.

19. The magnet structure of claim 18, where the core, the first magnet, the second magnet, and the core cap form an axial assembly about a central axis of the magnet structure, the axial assembly sized to fit within the magnet housing interior.

20. The magnet structure of claim 16, where the voice coil gap is only a single voice coil gap, and the core cap and magnet housing are configured to concentrate the combined magnetic flux of the first and second magnets substantially within the single voice coil gap.

21. The magnet structure of claim 16, where the second magnet that is closer in proximity to the voice coil gap than the first magnet has a greater magnetic power than the first magnet.

22. The magnet structure of claim 16, where the third magnet that is closer in proximity to the voice coil gap than the fourth magnet has a greater magnetic power than the fourth magnet.

23. The magnet structure of claim 16, where at least one of the core of the magnet assembly has a height greater than a combined height of the first magnet and the second magnet and the bucking core of the bucking magnet assembly has a height greater than a combined height of the third magnet and the fourth magnet.

24. The magnet structure of claim 16, the core has an outer periphery, the outer periphery having an annular notch.

25. A method of manufacturing a magnet structure of a loudspeaker, comprising:

providing a core comprising a first core end surface and a second core end surface, a magnet housing, and a core cap;

coupling a first magnetic material to the first core end surface and a second magnetic material to the second core end surface, where the core has a height greater than a combined height of the first magnetic material and the second magnetic material, and where the core has an outer periphery including a central portion of reduced diameter between the first and second ends, where the reduced diameter central portion extends over half of the height of the core;

coupling the magnet housing to the first magnetic material;

coupling the core cap to the second magnetic material such that the core cap and the magnet housing form a voice coil gap radially outside the core cap; and magnetizing the first and second magnetic materials such that a polarity of the first magnetic material is aligned in a same direction as a polarity of the second magnetic material.

26. The method of claim 25, further comprising positioning the core, the first magnetic material, the second magnetic material, the magnet housing, and the core cap to be substantially concentric about a central axis of the magnet structure.

27. The method of claim 25, wherein the magnet housing further comprises a base and an extension extending from the base to form an interior of the magnet housing, the method further comprising positioning the core, the first magnetic material, the second magnetic material, and the core cap within the magnet housing interior and spaced from the extension to form the voice coil gap; and coupling the base to the first magnetic material.

28. The method of claim 25, further comprising positioning the core cap and magnet housing to combine a magnetic flux of each of the first and second magnetic materials substantially within the voice coil gap.

29. The method of claim 25, further comprising:

providing a bucking core comprising a third surface and a fourth surface;

coupling a third magnetic material to the third surface and a fourth magnetic material to the fourth surface;

magnetizing the third and fourth magnetic materials such that a polarity of the third magnetic material is aligned in a same direction as a polarity of the fourth magnetic material, where the polarity of the third and fourth magnetic materials are opposite to the polarity of the first and second magnetic materials; and coupling the third magnetic material to the core cap.

30. A method of manufacturing a magnet structure of a loudspeaker, comprising:

providing a magnet assembly having a core cap, a magnetic material having a polarity in a first direction, and a magnet housing positioned relative to the core cap to form a voice coil gap;

providing a bucking core comprising a first bucking core end surface, a second bucking core end surface and a bucking core outer periphery including a central portion of reduced diameter between the first and second bucking core end surfaces, where the reduced diameter central portion extends over half of the height of the bucking core;

coupling a first bucking magnetic material to the first bucking core end surface and a second bucking magnetic material to the second bucking core end surface;

magnetizing the first and second bucking magnetic materials such that a polarity of the first bucking magnetic material is aligned in a same direction as a polarity of the second bucking magnetic material, positioning the bucking core and bucking magnetic materials so that the polarity of the first and second bucking magnetic materials are opposite to the polarity of the magnetic material of the magnet assembly; and coupling the first bucking magnetic material to the core cap.

31. The method of claim 30, where the bucking core has a height greater than a combined height of the first bucking magnetic material and the second bucking magnetic material.

32. The magnet structure of claim 1, where the core central portion of reduced diameter is terminated by angled regions.

33. The magnet structure of claim 12, where the bucking core central portion of reduced diameter is terminated by angled regions.

34. The magnet structure of claim 16, where the bucking core central portion of reduced diameter is terminated by angled regions.

35. The method of claim 25, where the core central portion of reduced diameter is terminated by angled regions.

36. The method of claim 30, where the bucking core central portion of reduced diameter is terminated by angled regions.

* * * * *